United States Patent [19]
Margen

[11] 3,890,787
[45] June 24, 1975

[54] METHOD AND MEANS FOR HEATING BUILDINGS IN A DISTRICT HEATING SYSTEM WITH WASTE HEAT FROM A THERMAL POWER PLANT

[75] Inventor: Peter Heinrich Erwin Margen, Nykoping, Sweden

[73] Assignee: Aktiebolaget Atomenergi, Sweden

[22] Filed: Mar. 15, 1973

[21] Appl. No.: 341,280

[30] Foreign Application Priority Data
Mar. 17, 1972 Sweden.............................. 3513/72

[52] U.S. Cl. ........................ 60/648; 236/49; 237/13
[51] Int. Cl. ............................................... F24d 3/04
[58] Field of Search................. 237/13, 1 R; 60/648

[56] References Cited
UNITED STATES PATENTS

| | | | |
|---|---|---|---|
| 379,744 | 3/1888 | Timby.................................. | 237/13 |
| 382,384 | 5/1888 | Prall.................................... | 237/13 |
| 465,298 | 12/1891 | Timby.................................. | 237/13 |
| 576,718 | 2/1897 | Bolton................................. | 237/13 |
| 2,166,509 | 7/1939 | Smith................................... | 237/1 R |
| 2,287,215 | 6/1942 | Williams.............................. | 236/49 |
| 3,488,961 | 1/1970 | Gerber................................. | 60/648 |

Primary Examiner—William E. Wayner
Assistant Examiner—William E. Tapolcai
Attorney, Agent, or Firm—Toren, McGeady and Stranger

[57] ABSTRACT

The waste heat from a thermal power plant is transported through a municipal heating network to a plurality of buildings to be heated. The quantity of heat thus supplied to the buildings is higher than that required for the heating of the buildings. The excess heat is released from the buildings to the atmosphere in the form of hot air.

27 Claims, 2 Drawing Figures

METHOD AND MEANS FOR HEATING BUILDINGS IN A DISTRICT HEATING SYSTEM WITH WASTE HEAT FROM A THERMAL POWER PLANT

The invention relates to a method and means for heating buildings supplied by a district heating system, with waste heat from a thermal power plant.

Thermal power plants must generally be built near the towns which are to be supplied with heat from these plants. This often means that it is not possible to choose sites where there are satisfactory natural sources of cooling water to take care of the waste heat when the heat requirement for heating the houses is insufficient.

The object of the invention is artificially to increase the quantity of heat, when necessary, which the district heating system can deal with, and thus also increase the production of electricity. The district heating system is thus utilized as a heat-pool or heat consumer of variable capacity (within certain limits) for the thermal power plant. Another object of the invention is to provide such a regulation system that this quantity of heat from the thermal power plant can be freely controlled by means of a simple signal, without the need for individual instructions, electric control impulses or the like to the individual buildings. The invention is of particular economic interest in connection with district heating systems for relatively low water temperatures and thus a high percentage of electricity production. Certain problems arise when using the invention in such systems, and the invention solves these also.

Yet another object of the invention is to reduce the total costs of the thermal power plant and the district heating system by making it possible to cool off the waste heat from the thermal power plant solely by means of heat-exchangers located in the buildings supplied by the district heating system, these heat-exchangers being used at the same time to heat the buildings.

The method of the invention comprises supplying an excess of waste heat from the power plant to the buildings, part of this excess of waste heat being used to heat the buildings and the remainder of said excess of waste heat being released to the atmosphere in the form of hot air.

The district heating plant of the invention comprises a thermal power plant including a heat-exchanger for taking care of waste heat, distribution pipes for hot water from the heat-exchanger to a number of buildings, and return pipes for water being returned from the buildings to the heat-exchanger, and is characterized in that each building is provided with a heat-exchanger in which the hot water from the thermal power plant is cooled by air, that channels are arranged to lead some of the air heated in the heat exchanger to the rooms of the building, and that channels are arranged to lead the remainder of the heated air to the atmosphere.

The invention will not be further described with reference to the accompanying drawings.

Figure 1:
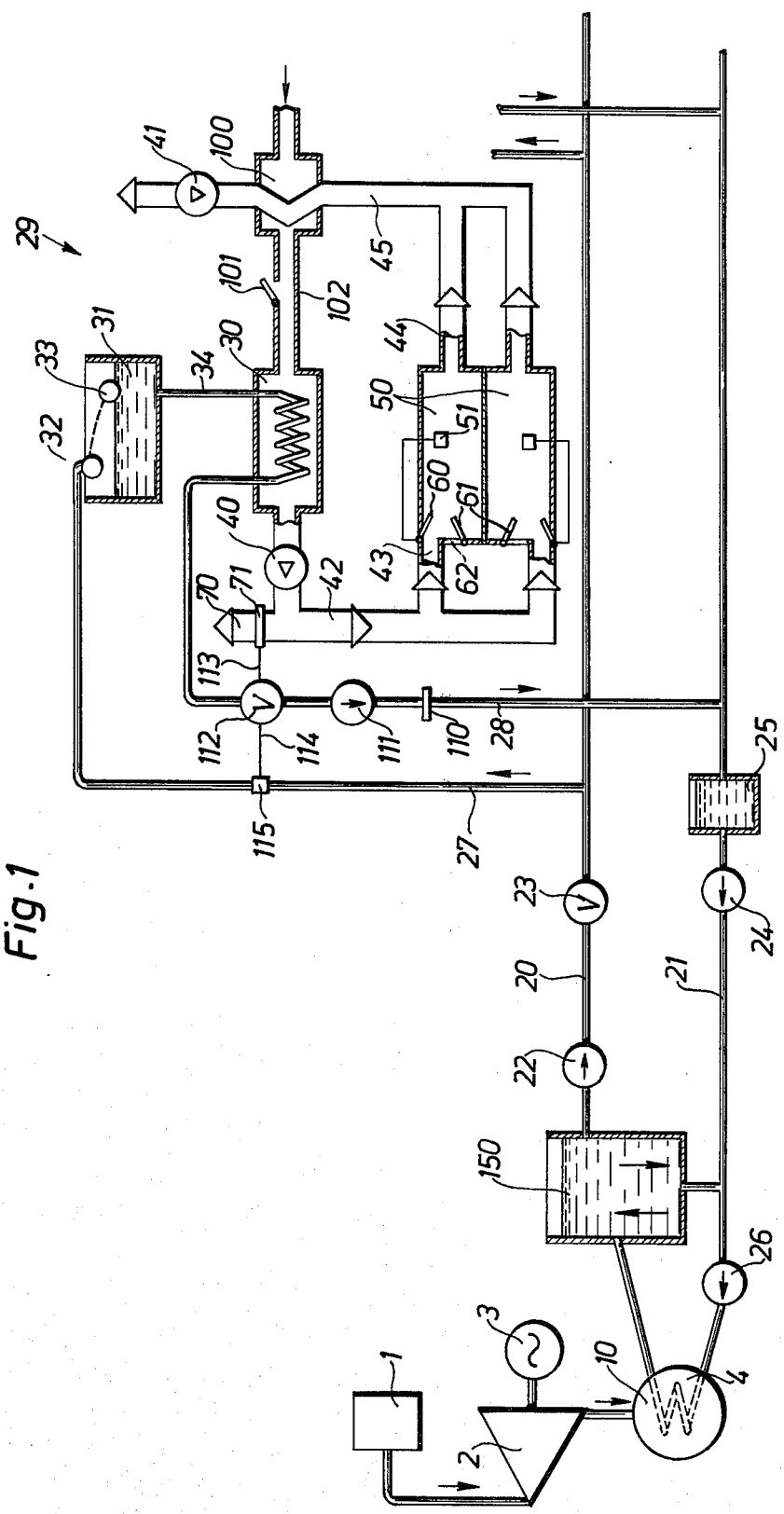
FIG. 1 shows one embodiment of a municipal heating network according to the invention.

The plant according to FIG. 1 comprises a steam-generating machine 1 for example a nuclear reactor. The steam drives a turbine 2, which drives an electric generator 3. Steam from the turbine 2 is led to a condensor 10. A heat-exchanger in the condensor 10 is in communication with a main distribution pipe 20 carrying hot water to a number of buildings 29, and with a main return pipe 21. In order to balance variations over a 24-hour period a hot-water accumulator 150 is connected by its upper part in the distribution pipe 20 and by its lower part in the return pipe 21. A pump 22 and a valve 23 are arranged in the pipe 20, and a pump 24 and water container 25 are arranged in the return pipe 21.

The building 29 has a hot-water container 31 to which hot water is led through a local distribution pipe 27. The water level in the container 31 is kept constant by means of a valve 32, actuated by a float 33. Hot water from the container 31 is led through a pipe 34 to an air-cooled heat-exchanger 30, and the water cooled in said heat-exchanger is led through a local return pipe 28 to the main return pipe 21. The return pipe 28 has a measuring flange 110, a pump 111 and a valve 112.

The heat-exchanger 30 is in communication with a supply pipe 102 for air from the atmosphere. The pipe 102 contains an air pre-heater 100 and a valve 101 through which air from the atmosphere can be shunted past the pre-heater 100. In the outlet pipe for the heated air from the heat-exchanger 30 a fan 40 is arranged which blows the hot air either through a pipe 70 to the atmosphere, or through pipes 42, 43 to rooms 50 in the building 29. A damper 60 is arranged in the pipe 43, this damper being operated by a thermostat 51 in the room 50. The room 50 is also provided with an inlet 62 for fresh air, which can be opened and shut by means of a damper 61.

By way of pipes 44, 45 air is led from the rooms 50 through the preheater 100 where it gives off heat to the in-coming air and is blown out into the atmosphere by means of a fan 41 which keeps the pressure in the building at approximately atmospheric pressure. If it is desired to keep the pressure in the rooms 50 more exactly at atmospheric pressure, the inlet openings 62 may be connected to the pressure side of a fresh-air fan.

The arrangement according to FIG. 1 functions in the following manner:

The temperature in the rooms 50 is regulated individually by thermostats 51 which are set at the desired temperature and which, if the temperature becomes higher than the value set, throttle the flow of hot air coming in through the valves 60 so that the temperature in the room decreases.

At the same time the fan 40 endeavours to keep the air circulation through the heat-exchanger 30 constant. If the throttling of the thermostatically controlled valves 60 results in the hot air intake to the rooms 50 becoming less than the air circulation through the heat-exchanger 30, the excess hot air is released to the atmosphere through the pipe 70. Since the fan 41 sucks out a constant quantity of air from the building, the decrease in the quantity of hot air supplied to the rooms 50 is compensated by an increase in the quantity of air drawn in from the atmosphere through the inlet openings 62. Alternatively the dampers 60 and 61 may be combined as one unit which regulates the proportion between hot and cold air.

If it is desired to increase the thermal power which is cooled off in the district heating system, the power supplied to the main distribution pipe 20 may be increased either by 1. increasing the temperature of the water leaving the heat-exchanger 4 in the condensor 10, which takes place automatically if the flow of steam through the turbine 2 is increased and the water circulation through the condensor 10 is kept constant, or 2. increasing the quantity of water circulating through the pipe 20, for example by varying the speed of the pump 22 or the throttling effect of the valve 23 without affecting the temperature of the water going out to the pipe 20 from the thermal power plant, or 3. combination of the above two methods.

The result of each of these three alternatives is that the average temperature difference between the water and the air in the heat-exchanger 30 increases, so that the power transmitted in the heat-exchanger also increases. The temperature of the air leaving the heat-exchanger will then also increase. In order to keep the room temperatures constant under these conditions, the thermostatically controlled dampers 60 decrease the hot air intake to the rooms 50, which in turn leads to an increase in the quantity of excess hot air which is released to the atmosphere.

It is clear from the description that all that has to be done by those in charge of the power plant when it is desired to artificially increase the power cooled away in the district heating system is to fulfil (1), (2) or (3) at the thermal power plant itself. The rest is taken care of by the control systems in the buildings.

If should be pointed out, however, that this system results in a certain amount of excess heat being normally cooled away to the atmosphere. The magnitude of the excess heat can be adjusted by those in charge of the thermal power plant, in the manner described above. However, if the excess becomes too little, there is a risk of a heat deficiency occurring in some of the buildings so that it is impossible to achieve the desired room temperature even when no air is released to the atmosphere.

In order to avoid this risk, certain minimum limits may be determined for the thermal power transmitted to the pipe 20, for example as a function of the temperature of the atmosphere. For example, using control method (2), an impulse controlled by the temperature of the atmosphere may be allowed to put a limit on the minimum quantity of water circulating in the pipe 20.

Another way of avoiding this risk is the following: The valve 112 in the pipe 28 is normally allowed to regulate the quantity of water circulating through the heat-exchanger 30 to a value where only a very small quantity of hot air reaches the atmosphere through the chimney 70, for example a few percent of the maximum flow. The control impulse is obtained by way of a signal conduit 113 due to the pressure drop over a flow resistance flange 71 in the chimney 70.

With this normal control method, the building always receives just enough heat for keeping the rooms 50 heated. If it is desired to increase the heat transfer to the atmosphere, the pressure in the pipe 27 is increased by means of the pump 22 or the valve 23. The pressure is measured by a gauge 115 in the pipe 27 and a signal is sent through a signal conduit 114 to block the signal which is endeavouring to shut the valve 112. Due to this blocking, the valve 112 will remain in open position and the heat-exchanger 30 will cool away maximum thermal power. The resultant increase in air temperature will then, in the manner described previously, result in an increase of the quantity of hot air being released to the atmosphere.

If different values of the pressure triggering the blocking signal are chosen for different buildings, a gradually increasing pressure in the pipe 20 will result in a gradually increasing number of buildings cooling off maximum heat power to the atmosphere. In this way a gradual increase is obtained in the heat power cooled away by the district heating plant.

With the system described, the upper limit for the heat power cooled away by the district heating system is determined by the quantity of water conveyed in the pipes. It is desirable that this maximum heat power is fully exploited to provide efficient heating of the buildings on the coldest winter day of the year. It is then advisable to connect the the air pre-heater 100 in order to recover some of the heat from the air being evacuated for pre-heating the fresh air. During the rest of the year, however, less heat is required to warm the buildings and it is therefore desirable to be able to transfer the excess heat to the atmosphere. The quantity which can be transferred to the atmosphere can be further increased on days when the temperature of the atmosphere is not too low, by opening the damper 101 so that none of the heat in the evacuation air leaving the building is recovered for heating the building. The damper can be opened by means of an automatic signal, for example, if the temperature of the atmosphere rises above a certain value. However, if on certain occasions this possibility of increasing the heat power supplied to the district heating plant is not to be utilized, means may be arranged which permit the damper to open only when certain conditions are fulfilled which clearly indicate that the operator of the thermal power plant desire to further increase the thermal power cooled away. In the regulating system (2), for example, said means may be designed to allow the damper 101 to open only when the quantity of water circulating through the building exceeds a predetermined minimum value. When the quantity of circulating water is less than this value, this indicates that the operator does not desire to exploit the maximum capacity of the district heating system to cool away thermal power.

This extra flexibility is thus also achieved without any extra steps being taken by the operator and without the need for any special signal from the buildings to the operator or vice versa. The pressure drop over the measuring flange 110 may suitably be used as a signal for the minimum quantity of circulating water permitting the damper 101 to open.

Control system (2) is particularly suitable where it is desirable to limit the maximum temperature in the distribution pipes 20, 27 and the heat-exchanger 30 to certain values. This is the case, for example, if plastic, or some other material which will not stand high temperatures, is to be used, for the pipes or the heat-exchanger. It is then important for the heat-exchanger 30 to be protected against too high internal overpressure of the water. This is done with the help of the tank 31, the surface of the water in this tank being open to the atmosphere. The flow of water into this tank is regulated by the float 33 which actuates the valve 32, i.e., closes it when the water level in the tank exceeds a certain value.

If the district heating system supplies hot water to buildings 29 of different heights, pumps 111 may be necessary in the local return pipes from certain buildings so that the water from the open tanks 31 in the various buildings can be supplied to the same main return pipe 21.

The hot water accumulator 150 provides increased flexibility in the availability of the heat cooled away from the residential area during a 24-hour period for generating electricity. For example, such a hot water accumulator allows the heat which has been cooled away during a 24-hour period to be used for electricity production only during the 4 hours when the demand for electricity is greatest. The peak load power can thus be increased by a factor of $24/4 = 6$.

Figure 2:
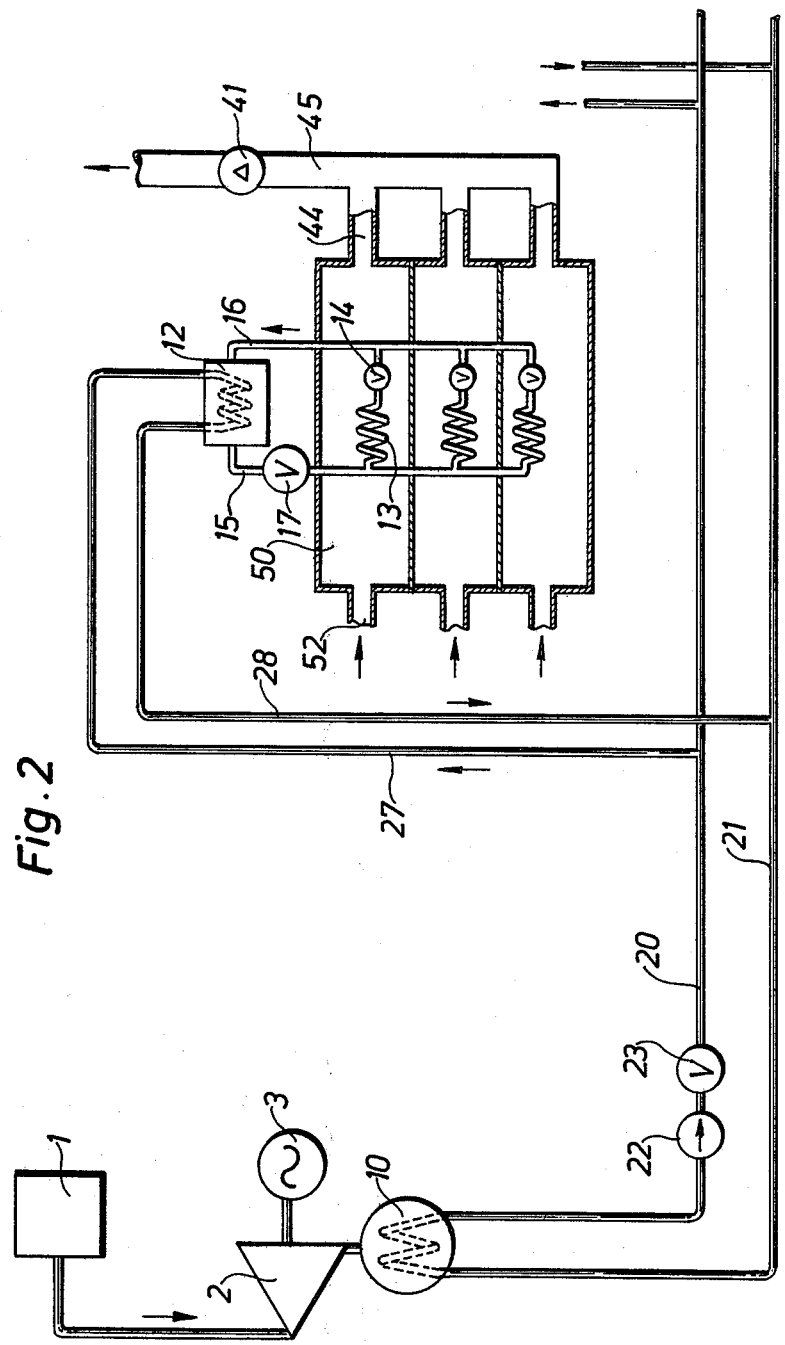
FIG. 2 shows a variant of the plant according to FIG. 1.

FIG. 2 uses the same reference characters as FIG. 1 for corresponding parts. According to FIG. 2 a conventional water/water heat-exchanger 12 is installed in each building, this heat-exchanger being fed with hot water through the pipes 20, 27. Hot water is led from the secondary side of the heat-exchanger through a pipe 15 with the help of a pump 17 to radiators 13 in rooms 50. The return water flows through a pipe 16. The temperature of the air in the rooms 50 is regulated by means of valves 14, which are preferably controlled thermostatically. The quantity of evacuating air through the fan 41 is increased when it is desired to increase heat transmission to the atmosphere. Since the radiators are dimensioned to deal with the heating requirement even on the coldest day, there is for the rest of the year a margin which can be utilized for increased transmission of heat power to the atmosphere in this way.

The drawback with the plant according to FIG. 2 is primarily that during hot summer days, when the temperature of the atmosphere may be as high as the room temperature, thermal power cannot be transmitted to the atmosphere through the evacuating air. According to FIG. 1, however, the air which is released to the atmosphere has a higher temperature than the atmosphere, so that the heat power can be transferred to the atmosphere even on the hottest summer day. Furthermore, the plant according to FIG. 2 tends to cause draughts in the rooms when a great deal of thermal power is to be cooled away. For these reasons the plant according to FIG. 1 is usually to be preferred.

What is claimed is:

1. A method of operating a combined electric power generating station and a district heating system including a plurality of buildings containing individual rooms which are to be heated with waste heat from the power station, comprising the steps of generating steam, using the steam to generate electric power, passing the steam after its use for generating electric power in indirect heat transfer relation with water for transferring heat to the water for adequately cooling the steam and for transferring to the water an amount of heat at least sufficient for heating the buildings, flowing the heated water to an enclosed heat exchange zone in each building to be heated, passing a fluid medium through the heat exchange zone in indirect heat transfer relation with the heated water for heating the fluid medium, recirculating the water from the heat exchange zone for subsequent passage in heat transfer relation with steam from the power station, flowing the heated fluid medium through the building for heating the ambient air in individual rooms therein, and regulating the transfer of heat to the air in individual rooms so that any excess heat is released to the atmosphere.

2. A method, as set forth in claim 1, including the further steps of using air as the fluid medium, passing the heated air from the enclosed heat exchange zone through enclosed flow paths to the individual rooms in the building, heating the rooms with the heated air, and withdrawing the heated air and discharging it to the atmosphere.

3. A method, as set forth in claim 2, including the steps of providing an outlet to the atmosphere for the air from the enclosed flow paths prior to introducing the heated air into the individual rooms, and regulating the flow of heated air after it leaves the heat exchange zone so that an amount of air not required for heating the individual rooms can be discharged to the atmosphere.

4. A method, as set forth in claim 1, including the further steps of using water as the fluid medium for heating the individual rooms, circulating the heated water after its passage through the enclosed heat exchange zone through heat transfer members in the individual rooms for heating the air therein, and withdrawing the heated air from the individual rooms for discharging excess heat to the atmosphere.

5. A method, as set forth in claim 1, including the steps of varying the thermal power supplied to the district heating system by varying the quantity of water circulated in heat exchange relation with the steam, and automatically controlling the temperature in the individual rooms of the building by maintaining a desired temperature within the individual rooms.

6. A method, as set forth in claim 5, including the step of varying the temperature of the water after its passage in heat exchange relation with the steam.

7. A method, as set forth in claim 5, including the step of varying the temperature of the water prior to its passage in heat exchange relation with the steam.

8. A method as set forth in claim 1, including the steps of varying the thermal power supplied to the district heating system from the power station by adjusting one of the pressure and temperature conditions of the water supplied to the enclosed heat exchange zone after its passage in heat exchange relation with the steam from the power station, and monitoring the adjusted conditions.

9. A method, as set forth in claim 8, including the steps of monitoring the pressure of the heated water flowing to the enclosed heat exchange zone, and increasing the supply of water to the heat exchange zone to a maximum value when the monitored pressure reaches a predetermined value.

10. A method, as set forth in claim 9, including the step of selecting a predetermined pressure for each building in the district heating system in accordance with the relative pressure conditions effecting the building and the pressure conditions in the flow path for recirculating the water into heat transfer relation with the steam from the power station.

11. A method, as set forth in claim 1, including the steps of setting a minimum limit for the thermal power supplied to the district heating plant by the power station, and monitoring the ambient temperature for adjusting the thermal power supplied to the district heating system for assuring an adequate amount of heat for the buildings in the district heating system.

12. A method, as set forth in claim 3, including the steps of automatically controlling the quantity of air taken into the building at a minimum level, monitoring the amount of hot air discharged from the building to the atmosphere, and adjusting the amount of air taken into the building in accordance with the amount of hot air discharged from the building.

13. A method, as set forth in claim 3, including the steps of preheating the air supplied to the enclosed heat exchange zone by passing the air in indirect heat transfer relation with hot air being discharged from the building.

14. A method, as set forth in claim 13, including the step of admitting the air to be heated in the heat exchange zone at a location downstream from the location of the preheating step.

15. A method, as set forth in claim 14, including the steps of monitoring the atmospheric temperature, and cutting out the preheating step when the atmospheric temperature rises above a certain value while maintaining the water circulating to the enclosed heat exchange zone in the building at a certain value.

16. A method, as set forth in claim 3, including the steps of withdrawing a substantially constant flow of air from each building in the district heating system, supplying heating air and atmospheric air to each of the rooms, regulating the supply of heating air and atmospheric air into each room by thermostatically monitoring the air in each room, flowing a substantially constant amount of air through the heat exchange zone in each building and releasing the difference between the flow of air through the enclosed heat exchange zone and the flow of air withdrawn from each building prior to supplying the heated air from the heat exchange zone to the individual rooms in the building.

17. A method, as set forth in claim 8, including the steps of limiting the pressure of the heated water supplied to the heat exchange zone by communicating the heated water with an open container and controlling the flow of the heated water through the heat exchange zone.

18. A method, as set forth in claim 8, wherein the step of controlling the flow of the heated water is carried out by monitoring the temperature conditions of the hot water flowing to the heat exchange zone.

19. A method, as set forth in claim 17, wherein the step of controlling the flow of the heated water is carried out by monitoring the pressure conditions of the heated water flowing to the heat exchange zone.

20. A method, as set forth in claim 3, including the step of accumulating the water flowing in the district heating system to and from heat exchange with the steam from the power station.

21. District heating system including a plurality of buildings containing individual rooms to be heated, comprising a thermal power plant utilizing steam to generate electricity and including a first heat exchanger arranged to receive the steam after it has been used in generating electricity for transferring waste heat from the steam, distribution pipes connected to said first heat exchanger for flowing water from said first heat exchanger after it has passed in heat transfer relation with the steam to the buildings in the district heating system, and return pipes for recirculating the water from the buildings to the first heat exchanger, wherein the improvement comprises a second heat exchanger located in each building, said distribution pipes and return pipes connected to said second heat exchanger for circulating the heated water therethrough, conduit means connected to said second heat exchanger for flowing air therethrough in indirect heat transfer relation with the heated water, first channels connected to said second heat exchanger for conveying heated air to individual rooms in the building, and a second channel connected to said first channels upstream from the point at which they supply air to the individual rooms for conveying heated air to the atmosphere.

22. District heating system, as set forth in claim 21, wherein thermostatically controlled dampers are positioned at the inlet ends of said first channels opening into the individual rooms for regulating the quantity of heated air supplied into the rooms.

23. District heating system, as set forth in claim 22, wherein third channels are connected to the individual rooms in the building for supplying atmospheric air into the rooms, and a thermostatically controlled damper arranged in each of said third channels for regulating the quantity of atmospheric air supplied into the rooms.

24. District heating system, as set forth in claim 21, wherein a air preheater is positioned in the path of the air flowing into said second heat exchanger, and air flow conduits connected to the individual rooms in the building and to said preheater for flowing air removed from the individual rooms through the preheater in indirect heat transfer relation with the air being directed into said second heat exchanger.

25. District heating system, as set forth in claim 21, wherein an open supply tank is connected in said distribution pipes for supplying heated water to said second heat exchanger for maintaining the water pressure in the second heat exchanger constant, flow control means located in said return pipes between said second and first heat exchangers, and means located in said second channel and connected to said flow control means for regulating said flow control means in accordance with at least one of the temperature and pressure conditions of the air flowing through said second channel.

26. District heating system, as set forth in claim 25, wherein means are arranged for controlling the pressure of the heated water in said distribution pipes, and means for monitoring the pressure of the heated water in said distribution pipes and connected to said flow control means for regulating said flow control means for producing a maximal flow in said return flow pipes.

27. District heating system, as set forth in claim 26, wherein said means for monitoring the pressure in said distribution pipes in different buildings are set to operate at different pressures.

* * * * *